United States Patent Office 2,698,818
Patented Jan. 4, 1955

2,698,818

PRODUCTION OF STARCH CONVERSION PRODUCTS

Max A. Staerkle, Baech, and Emil Meier, Waedenswil, Switzerland, assignors to Blattman & Co., Waedenswil, Switzerland, a firm of Switzerland No Drawing. Application February 1, 1951, Serial No. 208,972

Claims priority, application Switzerland April 2, 1946

15 Claims. (Cl. 127—38)

This invention relates to a new process for the production of starch conversion products, by which the efficiency and control of conversions can be greatly improved and new and improved products can be obtained. Among such products are improved "soluble" starches, British gums, dextrins and other modified starches or starch derivatives, which are especially valuable for paper or textile finishing, as sizings, or as adhesives.

This application is a continuation-in-part of our copending application Serial No. 738,224, filed March 29, 1947, now abandoned.

The starch conversion products of types most analogous to those here produced, when made by known processes, are characterized by the presence not only of desired degradation products but also of a comprehensive series of undesired constituents and properties. The latter are particularly pronounced in cases of relatively strong or extensive degrees of degradation. For example, it has been possible heretofore to produce a white dextrin that is practically completely soluble in cold water only by using such a strong degree of degradation that the product acquires an objectionably high percentage of reducing constituents and hygroscopic properties.

In the case of yellow dextrins it has been possible to work with relatively small additions of degrading chemicals or with no added chemical agents, but in such cases yellow to brown end products result from the roasting processes employed.

Furthermore, the nature of the known processes has made the dextrins heretofore obtained markedly heterogeneous in their molecular composition, and such products have the great disadvantage that they yield hard and brittle substances in practical use, such, for example, as brittle or fragile so-called "writing" dressings or adhesives which lose their property of binding or adhering to paper when used for stiff or hard papers. This difficulty may be diminished by additions of softeners, which usually are hydroscopic agents; but this introduces other difficulties, such as that the product becomes sticky in damp weather.

Methods are known, it is true, which show these disadvantages to a reduced degree. The dextrination of disrupted starches (cold water swelling starches or pastes) and etherification of starches are examples. The known methods of these types, however, are objectionably expensive and some of them involve large losses of materials.

It is to be observed further that industry needs for many purposes starches which closely resemble dextrins in respect to the degree of degradation but in which the original starch characteristics, such as dispersibility in hot water, insolubility in cold water, blue iodine reaction, freedom from color and odor, film elasticity, non-reducing properties, etc., should be retained. The products heretofore available for such needs range from soluble starches to dextrins, varying with the degree of degradation, or have been produced by known methods utilizing diastase, oxidizing or other chemical agents or etherification, or by physical methods. All of these known methods, however, suffer the disadvantage, either that by-products are formed having, in addition to the desired degradation products, undesired properties such as solubility in cold water, color, odor, reducing constituents or foreign chemical constituents, or that the methods employed are objectionably complex and expensive.

The purpose of the present invention is to provide processes by which the aforementioned disadvantages can be eliminated or greatly reduced and by which valuable new starch conversion products can be obtained.

According to this invention, starch in finely divided form is first modified chemically by subjecting it to the action of a suitable chemical agent at limited heating temperatures while progressively eliminating the free water content of the material with the aid of a vacuum, after which the dehydrated preliminary conversion product is torrefied or thermally degraded in a dry non-oxidizing environment by heating it at an elevated temperature under a vacuum or in a non-oxidizing or inert gas, i. e., substantially in the absence of oxygen. When the thermal decomposition has proceeded to a desired degree, which can be closely controlled by selection of the temperature and duration of the final heating, the material is cooled while still being held in a non-oxidizing environment, to obtain the desired starch conversion product.

The process is employed for dextrinization so as to obtain virtually any desired product in the nature of soluble starches, British gums, dextrins, and the like, by treating starch powder impregnated with a suitable starch degrading or dextrinizing chemical. The starch degrading chemical may be any of those used in the dextrinization arts. Acidic substances such as inorganic and organic acids and salts of acid reaction are particularly effective, the most usual being acids which add no foreign residues to the converted material; but various neutral salts also may be used, such as calcium chloride and others; as well as various alkaline substances, such as sodium hydroxide, ammonia and other bases, or borax, sodium carbonate and other salts of alkaline reaction. Moreover, valuable dextrinization products in the nature of certain British gums may be obtained by making use of inherent chemical reactivity in the starch, i. e., without the addition of a reagent for this purpose, particularly if the starch powder itself has an acid reaction or has been produced by a process making use of a chemical or biochemical reagent.

The principles of the present invention can also be applied similarly, with important advantages, for the production of various modified starches or starch conversion products other than dextrinization products. For example, the chemical modification of the starch in the first conversion stage may be an esterification or etherification thereof, effected for example in the presence of an alkali such as sodium hydroxide and an etherifying agent such as a mono- or tri-chlor acetic acid, or a condensation of the starch with an aldehyde, as set forth in our copending application Serial No. 208,971, filed February 1, 1951; or it may be an enzymatic conversion or an addition or a substitution reaction, or a combination of any of such reactions with the action of a starch degrading or dextrinizing chemical.

In any application of the invention the treatment is applied to a finely divided or powdered starch which initially may be commercially dry, partially pre-dried or even in a moist condition. Generally, the raw starch powder is first to be impregnated with a modifying chemical, which may be supplied in any desired manner. A particularly effective procedure, however, is to supply the chemical agent in gaseous form, for example, by introducing HCl gas in the case of acid conversions, or to supply a solution of the agent as a fine mist or spray, after the starch has been placed under vacuum. A deep and even impregnation of the starch granules, which favors homogeneous reactions, is obtained in this way.

Upon completion of the impregnation, or after any desired period of action of the chemical agent under atmospheric conditions, the first stage of the conversion is consummated with continuous diminution of the water content of the material by heating the material under vacuum, at limited temperatures, until it contains at most so little water that it can no longer form paste or lumps even in the torrefaction stage of the process. That condition exists when practically all the free water content of the starch has been eliminated. It can be reached readily under vacuum at limited heating temperatures, which should be insufficient of themselves to degrade the starch thermally, i. e., below dextrinization temperatures and so limited that no paste or lumps will form in the course of the dehydration. Thus temperatures between about 60° and 125° C. may be employed for the first stage, although the temperature to be applied at any time is limited by the changing pasting temperature of the material, which is inversely related to its water content. As the water content of the material is reduced the temperature may be raised to strengthen the dehydration, if still kept insufficient of itself to degrade the starch thermally.

The continuous elimination of water in the first stage of the conversion serves a multiple function. First, it accelerates and enhances the efficiency of the chemical modification then effected by progressively increasing the reactant concentration wherever water exists in the starch. Second, while doing this it limits the temperature of the material to the point at which the active evaporation of moisture from the material takes place under the applied vacuum. Third, it brings the material homogeneously to a highly dehydrated condition that limits further reactivity of the chemical agent used and enables even heating and homogeneous thermal disintegrations to be obtained in the torrefaction stage. The dehydration is carried so far that no moisture evaporates from the material, hence no undercooling occurs in it from the latent heat of evaporation of water, while the powdery mass is subjected to the elevated temperatures used for the thermal degradation or torrefaction stage.

Thus the first stage yields a dehydrated preliminary conversion product which can be converted into extraordinary homogeneous starch conversion products having any of a wide range of determinate solubility and viscosity properties, as well as other desired properties hereinbefore mentioned, by torrefying it at a suitable elevated temperature, and then cooling the product, in a dry non-oxidizing environment.

The torrefaction in the absence of oxygen is another important feature of this invention, for oxidations, discolorations and other phenomena found to be shortcomings of usual starch torrefaction processes can be avoided in this way. Accordingly, the product of the first or chemical conversion stage is heated under vacuum, or in a non-oxidizing gas such as nitrogen, sulfur dioxide, carbon dioxide, or the like, to a suitable thermal degradation or dextrinization temperature which usually lies between 130° and 180° C., and the heating is continued at this temperature until a desired degree of disintegration has been reached. After being cooled in the same environment, the product is ready for use.

If desired, any chemical reactivity remaining in the material at the end of the first conversion stage may be inactivated before proceeding with the torrefaction. For example, an alkaline substance such as gaseous ammonia may be introduced to neutralize an acidic preliminary conversion product. In the use of a volatile chemical agent, such, for example, as hydrochloric acid, little residual reactivity can exist if the vacuum drying is completed at a temperature above that at which the chemical volatilizes from the starch material. Furthermore, any residue of the chemical agent existing in the starch where no free water remains can hardly exert objectionable reactivity in any event.

The entire process can be carried out advantageously under vacuum, and in such a practice the material is rendered completely anhydrous or practically so before it is brought to a temperature sufficient to degrade the starch thermally. On the other hand, when the torrefaction is carried out in a non-oxidizing gas instead of a vacuum a lesser degree of dehydration may exist in the material. It is sufficient if its free water content has been practically entirely eliminated before it is exposed to a torrefaction temperature, the free water content including any reaction water produced in the chemical modification stage but not including bound or chemically combined water that does not evaporate at the temperatures of the torrefaction. In general, starches which no longer give off water under heating at temperatures of about 60° to 125° C. (under normal pressure) can still be made to yield measurable quantities of water, sometimes up to nearly 7% of their weight, when exhaustively tested in known manner at a temperature of 160° C.

When starting the process with commercially dry to moist starch and operating under vacuum the water elimination will have proceeded to the required extent after about 2 to 4 hours of heating. Without vacuum a much longer heating period would be required.

The effect of the torrefaction stage is to break down homogeneously the relatively large molecular structures of the dehydrated preliminary conversion products, thus converting them into derivatives or modified starches which can possess any desired degree of degradation and any of an extremely wide range of desirable solubility and viscosity properties, depending upon the temperature and duration of the torrefaction and the particular modifying agent employed in the first stage. These derivatives possess an extraordinary degree of homogeneity, and they are quite free of the oxidation products or discolorations normally found in the nearest comparable products of conventional processes. Furthermore, the products obtained according to this process possess unusual stability against retrogradation.

The process of this invention can be applied with similar effects to all kinds of starches, including corn starch, wheat starch, potato starch, cassava starch, and others. It can be carried out completely in a single closed container or autoclave provided with continuously operative stirring means and suitable heating and cooling means. The degree of vacuum used can be varied widely, being primarily influential upon the duration of heating required at a given temperature in the first reaction stage. A low vacuum of the order produced by common vacuum pumps is quite satisfactory, for example, one of about 90 to 95%, although higher vacuums may be used if desired.

The new type dextrinization products obtained according to this invention are distinguished by a light, pure white to pale yellow color, increased elasticity, improved adhesive properties and a minimum content of reducing substances. A particularly unique quality of these products is their homogeneous molecular composition. In the case of the new dextrins a blue-violet iodine reaction is obtained which is characteristic of amylodextrins, whereas most nearly analogous dextrins prepared by common methods give a brown to red iodine reaction as a result of their heterogeneity or of their degradation partially having proceeded too far.

In the practice of the present process for dextrinization, the degradation can be continued as far as may be desired, so that, for example, products giving a red iodine reaction can be obtained. These, however, are superior to common dextrins having analogous degrees of degradation, in respect to the light color of the products and their other properties above mentioned. The degree of degradation in the products obtained can be controlled by selection of the temperature used for the heating in the thermal degradation or torrefaction stage of the process.

As another example, dextrins soluble in 50% alcohol also can be produced by controlling the degree of degradation.

Furthermore, the present process can be used so as to produce not only starch products soluble in cold water, but also such products which are more or less degraded and insoluble in cold water, though soluble in hot water, and which form clear solutions remaining fluid in the cold state for an extraordinarily long time—these products being so-called soluble starches which do not possess reducing properties. The degradation range of the present process is extraordinarily large because every degradation stage ranging from the native starch to alcohol soluble dextrin is attainable by its use.

A further advantage of this process lies in the fact that it is possible to use corn and wheat starches, etc., in this process for the production of high grade dextrinization products having properties which heretofore could be approached or obtained only by the use of potato or tapioca starch. The success obtained with such products made from corn starch, wheat starch and the like according to this process is at least as good as that obtainable with the use of products made from potato starch or tapioca starch according to the methods heretofore used.

For the production of starch dextrinization products according to this invention, a practice as follows may be employed to advantage. Commercially dry starch powder is brought to a pH value below 5.5, say pH 4.5 or lower, by impregnation with an acid medium. Then it is held under vacuum during a period of from one to five hours, while heating it at a temperature or temperatures which are not allowed to exceed the point of disruption or pasting of the starch. During this period the water content of the material reaches a reduced amount, depending upon the vacuum, which will prevent it from reaching the point of disruption or conversion into paste. Thereupon, the mass is heated further under vacuum so that its water content is reduced to below 1% before the heating temperature is raised high enough to begin the thermal degradation process. Then the thermal degradation is carried out under continued vacuum by increasing the temperature of the mass to one lying between 130° and 170° C. and holding this temperature, which is selected according to the desired degree of degradation. When the desired degree of degradation has been reached the product is cooled under continued vacuum and then discharged for use. The entire operation is carried out in a closed vacuum container or autoclave while continuously stirring the powdery material therein.

The production of other starch modification products or derivates can be carried out advantageously in substantially the same way, with the substitution of a suitable modifying chemical for the acid medium referred to above.

The dextrinization products obtained by this invention exhibit an entirely new range of properties as a result of the treatment applied, which give them distinctive advantages for uses in finishing, sizing and adhesive industries. These properties vary according to the degree of degradation employed. The cold water soluble products or dextrins obtained have properties analogous but distinctly superior to those of the dextrins heretofore produced, especially for uses as adhesives. The "thin boiling" or "soluble" starches obtained are a new type of degraded starches, comparable in usefulness to oxidized starches but different in molecular structure as shown by their different infra-red spectra. Among them are high molecular corn starch products which show substantially the same infra-red absorption maximum in the 6-micron band as raw potato starch, but which, in contrast to raw starch, are hot water soluble though insoluble in cold water and exhibit high adhesive powers, high film strength, low viscosity characteristics and good stability against molecular retrogradation.

The practice of this invention is further exemplified in the following examples:

Example 1.—Improved dextrin

An autoclave or jacketed vessel is provided, equipped with stirring mechanism and suitable heating and cooling means. 800 kg. of powdered potato starch in this autoclave are placed under vacuum and heated at an outside temperature of 70° to 90° C., while stirring. The heating under vacuum is continued until the water content of the starch has been reduced to about 9 to 10%, whereupon 390 grams of HCl gas are allowed to stream in. The mass is thereupon heated under vacuum for about four hours, until a temperature of 120° C. is reached. Then it is rapidly heated to 168° C. and is kept at this temperature under vacuum until a sample shows complete solubility in cold water. The charge is then cooled under vacuum, and a cold water soluble dextrin having desired properties as above mentioned is obtained.

Example 2.—Improved soluble starch

Potato starch powder, 800 kg., is impregnated with a dilute solution of hydrochloric acid composed of 860 grams of 32% HCl and 9 liters of water. The impregnated starch is then heated under low vacuum, in an autoclave as above mentioned, for about four hours until a temperature of 100° C. is reached. The chemical degradation is thereupon interrupted by admitting a stream of NH₃ gas into the autoclave until a sample of the mass shows a pH value of 5.0. Thereafter the temperature is raised under vacuum to 155° C., whereupon the vacuum is replaced by admitting nitrogen, and this temperature is maintained until the degradation has proceeded to such a point that a sample of the product forms a clear and thinly fluid solution in 3 to 4 parts of boiling water. Upon cooling, a product insoluble in cold water results.

Example 3.—Improved soluble starch

Commercial dry potato starch (a starch powder), 100 kg., is adjusted with 300 cc. of 2 N hydrochloric acid to a pH value of about 3.5 and held in an autoclave, while stirring for four hours at an outside temperature of 40° C. The autoclave is then put under vacuum, and the outer temperature is slowly brought to 100° C. with continued stirring. This temperature and vacuum are maintained until the water content of the charge is reduced to about 0.5%. Thereupon, after release of the vacuum with nitrogen, the inside temperature is raised to 155° C. and held there for about 30 to 45 minutes, until a sample of the product forms a clear and thinly fluid solution in 3 to 4 parts of boiling water. The product obtained after cooling the mass is insoluble in cold water, though soluble in hot water.

Example 4

500 kg. of powdered corn starch are mixed thoroughly with 20 kg. of powdered borax and then heated under vacuum to 125° C. in about 2½ hours. The water content determinable by test is then about 3%. Under continued vacuum the temperature is now raised evenly to 170° C. (substantially all the removable water having been eliminated when the temperature reaches about 125°–130° C.), and this temperature is held for about 3 to 5 hours until the desired viscosity has been attained. Then the product is cooled under continued vacuum. It is about 50% soluble in cold water and possesses high stability.

It will be noted that only about 3½% of borax is used in this example, whereas up to 10% is needed in conventional methods of starch modification or "British gum" production by use of borax. Moreover, the product here obtained is less heterogeneous and of lighter color than the nearest comparable products of known methods, and it has a considerably greater "body" and filming strength than known British gums.

Example 5

800 kg. of powdered potato starch are intimately mixed with 400 grams of $NaHCO_3$ and then uniformly impregnated with 1550 grams of $CaCl_2$ dissolved in 10 liters of water. The material is then introduced into an autoclave and, while continuously stirred therein, is gradually heated under a 90 to 95% vacuum during 2½ hours to 100° C. The material thus undergoes continuous dehydration during the action of the modifying chemicals. Then it is brought to 170° C. under continued vacuum and maintained at that temperature until the reaction product has attained a desired degree of cold water solubility, whereupon the material is cooled under vacuum. A product of British gum type, having high viscosity with high solubility in cold water, is obtained within 3 to 5 hours of heating at 170° C.

Example 6

800 kg. of wheat starch powder are impregnated with 1.5 liters of 25% ammonia solution, then gradually heated in three hours to 120° C. while held under vacuum of 90 to 95% in an autoclave as mentioned above. The removable water content of the mass then is about 3%. The vacuum then is released by introducing nitrogen gas, whereupon the material is heated to 160° C. and held at that temperature until a sample boiled in 8 parts of water has the consistency of a thin ointment. The product is then cooled in the nitrogen gas. It has a very high viscosity with little or no cold water solubility.

Example 7

200 kg. of corn starch powder are mixed with a solution of 10 kg. of 36° Baumé NaOH in 20 liters of 96° alcohol, then with a solution of 20 kg. of monochloracetic acid in 25 liters of water. The impregnated material is a moist starch powder. It then is heated under vacuum for two hours to 100° C., in an autoclave as mentioned above. At the end of this period the removable water content is about 6 to 7%. Then the material is brought to a temperature of 125° C. to 145° C. under continued vacuum, meanwhile having become substantially completely anhydrous, and it is held at the selected temperature under vacuum until a desired degree of transformation or reduced molecularity has been reached, whereupon it is cooled under vacuum. A final heating period of ½ to 1½ hours generally suffices to yield a valuable etherification product.

Example 8

700 kg. of a commercially dry potato starch powder having a pH of about 5.5 are placed in an autoclave as above mentioned and gradually heated under vacuum for 3½ hours to 100° C. The removable water content is then about 1 to 3%. Then the vacuum is released by introducing SO₂ gas, and the material is heated in this atmosphere to 175° C. and held at that temperature until it has reached the desired degree of degradation, after which it is cooled under vacuum so as to remove the SO₂. The SO₂ gas in the presence of the dehydrated starch exerts no appreciable chemical activity but keeps the torrefaction atmosphere non-oxidizing. The product here obtained possesses high molecularity without cold water solubility, being analogous to a British gum.

While the practice of this invention has been exemplified by the specification of various details and examples, it will be understood that these may be varied with plant equipment or operating requirements, with raw materials and with particular qualities desired in the products, without departing from the spirit or the scope of the disclosed invention which is intended to be defined by the appended claims.

We claim:

1. A process for producing starch conversion products which comprises placing a powdery mass of finely divided starch in a container and, while continuously stirring the mass in the container: forming a vacuum therein, then introducing hydrogen chloride gas to acidify the mass; then heating the mass under continued vacuum at temperatures below 130° C. and thus dehydrating it until its moisture content is below 1%; then under continued vacuum increasing the heating temperature to one between 130° and 180° C., depending upon the degree of degradation desired in the product, and holding this temperature until the desired product results; and then cooling the product under continued vacuum.

2. A process as described in claim 1, in which the acidulated mass is heated first for from 1 to 5 hours at temperatures below the pasting temperature of the starch and then is heated for a further period at a higher temperature not exceeding 130° C. to complete the dehydration before being raised to the final heating temperature.

3. A process for producing starch conversion products which comprises heating and progressively dehydrating under vacuum at temperatures below dextrinization temperatures a powdery mass of starch material containing moisture in the presence of a starch modifying agent, thus eliminating moisture from the material until its removable moisture content is not more than 3% and is so low that substantially no moisture evaporates from it in the ensuing steps, and thereafter heating the dehydrated mass in powdery state in a dry non-oxidizing environment inert to the material at increased temperatures sufficient to degrade the material thermally, until a desired degree of degradation is produced.

4. A process as described in claim 3, and then cooling the product from such increased temperatures in such dry non-oxidizing environment.

5. In a process as described in claim 3, forming said powdery mass by degasifying powdered starch by a vacuum and then delivering to the starch under vacuum a starch modifying agent in finely dispersed form.

6. In a process as described in claim 3, forming said powdery mass by partially dehydrating powdered starch under vacuum and then delivering to the starch under vacuum, while it still contains free moisture, a starch modifying agent in finely dispersed form.

7. A process for producing starch conversion products which comprises subjecting a powdery mass of starch material containing moisture and a starch modifying agent to the action of such agent while dehydrating the material by heating it under vacuum at temperatures below dextrinization temperatures, until the material contains less than 1% of removable moisture, thereafter heating the substantially anhydrous powdery mass under continued vacuum at increased temperatures sufficient to degrade the material thermally, until a desired degree of degradation is produced, and then cooling the product under continued vacuum.

8. A process for producing starch conversion products which comprises subjecting a powdery mass of starch material containing moisture and a starch modifying agent to the action of such agent while dehydrating the material by heating it under vacuum at temperatures below dextrinization temperatures, thus eliminating moisture from the material until its removable moisture content is not more than 3% and is so low that substantially no moisture evaporates from it in the ensuing steps, thereafter releasing the vacuum with a non-oxidizing gas inert to the material and heating the dehydrated powdery mass in such gas at increased temperatures sufficient to degrade the material thermally, until a desired degree of degradation is produced, and then cooling the product in such gas.

9. A process for producing starch dextrinization products which comprises heating and progressively dehydrating under vacuum a powdery mass of starch containing moisture and a dextrinizing agent at temperatures lower than dextrinization temperatures, thus eliminating moisture from the material until its removable moisture content is not more than 3% and is so low that no moisture evaporates from it in the ensuing steps, and thereafter heating the dehydrated mass in powdery state at dextrinization temperatures in a dry non-oxidizing environment inert to the material, until a desired degree of degradation is produced.

10. A process as described in claim 9, wherein said agent comprises an acidic reagent and the same is inactivated by introducing gas of alkaline reaction into the dehydrated material under vacuum before proceeding with the thermal degradation.

11. A process as described in claim 9, wherein said agent is volatilizable from the starch material and the vacuum drying is completed at a heating temperature exceeding the temperature of its volatilization.

12. A process for producing starch dextrinization products which comprises forming a powdery mass of starch containing moisture and a dextrinizing agent and having a pH below 5.5; dehydrating said mass by heating it under vacuum first for a period at a temperature below the pasting temperature of the starch and then further at a higher temperature still below 130° C., until the free water content of the material is eliminated and it is so anhydrous that substantially no moisture evaporates from it in the ensuing steps; and thereafter torrefying the dehydrated mass in powdery state at a temperature between 130° and 180° C. in a dry non-oxidizing environment inert to the material, until a desired degree of dextrinization is produced.

13. A process for producing starch conversion products which comprises progressively dehydrating a powdery mass of starch material containing moisture at temperatures below about 130° C., thus eliminating the free water content of the material and rendering it so anhydrous that substantially no moisture evaporates from it in the ensuing steps, thereafter heating the dehydrated powdery mass in a dry non-oxidizing environment inert to the material at increased temperatures above 130° C. and sufficient to degrade the material thermally, until a desired degree of degradation is produced, and then cooling the product in such environment.

14. A process for producing starch conversion products which comprises, while continuously stirring the mass: heating under vacuum at temperatures held below dextrinization temperatures a mass of powdered starch containing moisture and impregnated with hydrochloric acid, thus progressively eliminating moisture and hydrogen chloride from the material and reducing its removable moisture content to below 1%; under continued vacuum heating the substantially anhydrous material in powdery state at increased temperatures sufficient to degrade it thermally, until a desired degree of degradation is produced; and then cooling the product under continued vacuum.

15. A process for producing starch conversion products which comprises subjecting a powdery mass of starch material containing moisture and a starch modifying agent to the action of such agent while dehydrating the material by heating it under vacuum at temperatures below dextrinization temperatures, thus eliminating moisture from the material until its removable moisture content is not more than 3% and is so low that substantially no moisture evaporates from it in the ensuing steps, thereafter introducing nitrogen gas to the dehydrated powdery mass and heating the mass in nitrogen gas at increased temperatures sufficient to degrade the material thermally, until a desired product is formed, and then cooling the product in such gas.

References Cited in the file of this patent

UNITED STATES PATENTS

| | | |
|---|---|---|
| 432,358 | Berge | July 15, 1890 |
| 979,753 | Fielding | Dec. 27, 1910 |

(Other references on following page)

UNITED STATES PATENTS

| | | | |
|---|---|---|---|
| 1,305,291 | Lenders | June 3, | 1919 |
| 1,411,204 | Bright | May 28, | 1922 |
| 1,505,696 | Brindle | Aug. 19, | 1924 |
| 1,851,749 | Bergquist | Mar. 29, | 1932 |
| 1,983,732 | Beyer | Dec. 11, | 1934 |
| 2,156,488 | Bode | May 2, | 1939 |
| 2,359,378 | Morris | Oct. 3, | 1944 |
| 2,503,053 | Kerr | Apr. 4, | 1950 |
| 2,516,634 | Kesler | July 25, | 1950 |

FOREIGN PATENTS

| | | |
|---|---|---|
| 619,404 | Great Britain | Mar. 19, 1949 |

OTHER REFERENCES

Radley, "Starch and Its Derivatives," 2nd ed., N. Y. 1944, pp. 241 to 247.

Kerr, Chem. and Ind. of Starch, N. Y., 1944, pp. 251, 252, and 253.